Oct. 16, 1962     H. F. HEINTZMANN     3,058,341
FORCE MEASURING DEVICE FOR DETERMINING THE STRESSES UPON THE
FRAMEWORKS IN UNDERGROUND EXCAVATIONS AND THE LIKE
Filed March 13, 1959

INVENTOR.
HANS FRIEDRICH HEINTZMANN

BY Michael S. Striker

ATTORNEY

United States Patent Office 3,058,341
Patented Oct. 16, 1962

3,058,341
FORCE MEASURING DEVICE FOR DETERMINING THE STRESSES UPON THE FRAMEWORKS IN UNDERGROUND EXCAVATIONS AND THE LIKE
Hans Friedrich Heintzmann, Bochum, Germany, assignor to Bochumer Gesellschaft für Grubenausbau und Technik m.b.H., Bochum, Germany
Filed Mar. 13, 1959, Ser. No. 799,361
Claims priority, application Germany Mar. 20, 1958
4 Claims. (Cl. 73—141)

The present invention relates to force measuring devices in general, and more precisely to a force measuring device which is particularly suited for use in mining and related industries, e.g. in certain mine passages or shafts, also known as drifts. The force measuring device is inserted between the mountain wall and the framework or lining in the drift to determine the stresses with which the masses constituting the walls of a drift bear against the supporting framework. Accurate determination of stresses to which the lining is subjected is quite important as it facilitates proper dimensioning of the parts of which the lining is composed. Thus, accurate determination of forces, even of those acting against the lining at more or less acute angles, will render it possible to avoid overdimensioning of the framework and attendant waste in construction material. On the other hand, by knowing the forces acting against the lining, the operators will be able to calculate its strength in such manner as to avoid deformation and early destruction of the lining.

Known instruments presently utilized for such purposes usually comprise a pressure cell whose relatively movable component parts often become tangled, interlocked or otherwise disarranged, especially when subjected to external stresses which act thereagainst at a more or less acute angle. Such interlocking or canting of relatively movable component parts of known pressure cells invariably causes inaccuracies in measurement and may even impart permanent damage to the cells which, of course, results in even greater discrepancies between actual pressures and the readings obtainable by such devices. A further serious drawback of known pressure cells is that the resiliency of certain component parts thereof is relatively small and that, therefore, the readings obtained at comparatively low pressures are unreliable.

An object of the present invention is to provide a force measuring device which is particularly suitable for use in mine shafts at such locations where the direction of stresses cannot be determined in advance, i.e. a force measuring device which is capable of indicating stresses regardless of the angle at which the stresses are applied thereagainst.

Another object of the invention is to provide a force measuring device of the above outlined characteristics which is capable of measuring and indicating forces and pressures applied thereagainst at acute angles, and even such stresses which act in directions substantially parallel with the plane on which the force measuring device is supported.

A further object of the instant invention is to provide a force measuring device for determining the stresses to which the lining of a mine shaft or gallery is subjected, which is extremely simple in construction; which is relatively inexpensive in manufacture; which is very reliable and accurate in operation; which requires no refilling with a pressure medium; and which is not likely to become inoperative or to furnish inaccurate readings even after extended periods of actual use and while subjected to comparatively high stresses acting thereagainst in a number of widely different directions.

A still further object of the invention is to provide a force measuring device of the above described type which is so constructed that the initial pressure of the fluid medium which is entrapped therein may be readily adjusted within any desired range.

A yet further object of the present invention is to provide an extremely rugged force measuring device for use in mine shafts and like localities which is capable of furnishing accurate readings within a very broad range of pressures ranging up to and even exceeding 150 atmospheres.

A concomitant object of the present invention is to provide a force measuring device which is capable of furnishing accurate readings at very low as well as at comparatively high pressures.

The above and certain other objects of the present invention are attained by the provision of a force measuring device which consists essentially of a pressure cell comprising a pair of spaced pressure plates and a resiliently deformable tubular member disposed between and having each of its ends connected to one of the plates to define with the latter a pressure chamber which is filled with a hydraulic fluid, as well as a plurality of flexible, non-elastic connecting or coupling elements of fixed length each of which is anchored in both plates for restricting in all directions the movements of the plates with respect to each other to a maximum distance equal to the fixed length of the coupling elements.

A pressure indicator, e.g. a manometer, is connected with the pressure cell in such manner that the pressure medium may communicate between the chamber and the indicator whereby the latter is capable of visually or otherwise representing the pressures acting upon the plates and transmitted to the entrapped hydraulic medium. Due to the resiliency, yieldability and ready deformability of the tubular member which forms part of the pressure cell, and due to the provision of aforementioned flexible coupling elements, one of the pressure plates may be moved with respect to the other plate in any desired direction excepting away from the other plate to an extent greater than that determined by the fixed length of the flexible elements. The latter are disposed externally of the resilient tubular member and, since the compressed hydraulic pressure medium entrapped in the tubular member is preferably held at a predetermined and readily variable initial pressure in the range of e.g. between about 2.5 and 4 atmospheres, any tangling of the coupling elements with each other or with one or both pressure plates is, for all practical purposes, impossible. Therefore, when the instrument is put to actual use by anchoring one of the plates in a suitable support and by subjecting the other plate to stresses exerted thereagainst by a mountain wall in an underground excavation or the like, the indicator means will furnish accurate readings of stresses to which the plate is subjected regardless of the direction in which the stresses are applied against the plate. Thus, even the forces acting at an acute angle against the segments or sections of the supporting framework in a mine shaft or the like can be accurately and immediately determined by the measuring device of this invention.

The flexible coupling elements which connect the preferably coaxial discoid pressure plates externally of the resilient tubular member may be formed as chains whose ends may be welded or otherwise fixed to the respective plates, and which may include adjusting or tensioning means, e.g. turnbuckles, for varying the distance between the pressure plates and for thereby adjusting the initial pressure of the entrapped hydraulic medium. As before stated, the resiliency of the tubular member and the provision of flexible coupling elements of non-resilient material enable the plates to become displaced in response not only to stresses acting in directions substantially perpendicular to their main planes, but also to such stresses which may act against the one or the other plate off its center, at an acute angle, or even in directions substantially parallel with the planes of the plates. The stresses acting upon the plates are transmitted by the latter to the entrapped pressure medium which causes the indicating means to furnish accurate readings regardless of the magnitude of such stresses. When the forces acting against one of the plates are greatly inclined or substantially parallel with the latter's plane, the extent of lateral movements may be readily determined by merely dividing such inclined forces into a horizontal and a vertical component by following any of a number of well-known procedures.

As before stated, the entrapped hydraulic pressure medium is preferably maintained at a certain initial pressure of e.g. between 2.5 and 4 atmospheres. This enables the instrument to furnish very accurate readings even if a comparatively small external force will act against the pressure plates. Despite such initial pressure of the hydraulic medium, by suitable selection of its material the resilient tubular member remains sufficiently deformable to enable the plates to yield and to perform commensurate movements in response to stresses acting in any direction, whereby a further ground for inaccurate measurements is effectively eliminated. A further important feature of the novel device is that its load-displacement curve maintains its substantially linear character beginning at very low pressures, i.e. within the entire range of its operation.

The material of the resilient tubular member may be natural rubber or any of a wide variety of well known synthetic plastic substances with resilient characteristics. It should withstand stresses of between about 100 and 150 atmospheres, or even much higher stresses, if necessary. The central portion of the resilient tubular member is preferably formed as a bulge whose radius may approximate between about one-fourth and one-third of the outer diameter of the remaining portion of the resilient member. In its preferred form, the latter comprises at its respective ends a pair of external circular beads which are sealingly held against the inner sides of the pressure plates by suitable, preferably flanged, clamping rings or the like. Additional annular members may be provided in the end zone of the pressure chamber to be connected to the inner sides of respective pressure plates. The length of the resilient tubular member may approach between one-third an dtwo-thirds of its maximum outer diameter. Such dimensioning enables the resilient member to be readily yieldable to pressures acting in a number of widely different directions even if the hydraulic medium entrapped therewithin is maintained at relatively high initial pressures.

The instrument may be held against movements with respect to its support by suitable projections, by one or more wires, or in any other suitable way.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawings, in which:

Figure 1:
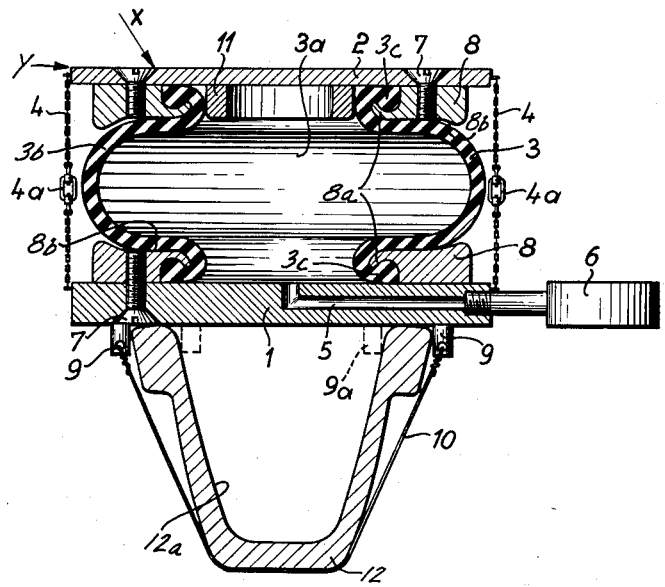
FIG. 1 is a central vertical section through the force measuring device.

Referring now in greater detail to the drawings, the force measuring device therein shown comprises a lower compressive stress-transmitting member or pressure plate 1, an upper compressive stress-transmitting member or pressure plate 2, and a resilient tubular member 3 having the shape of a sleeve and capable of relatively large deformations by being yieldable in response to pressures applied thereagainst in a number of different directions.

Thus, the resilient rubber-like material of member 3 is characterized by great flexibility, yieldability and deformability, and the member 3 defines therewithin a pressure chamber 3a whose lower and upper ends are bounded by the inner surfaces of plates 1, 2, respectively. Parts 1, 2 and 3 constitute a pressure cell which, when in actual use, is filled with a liquid pressure medium which is preferably maintained at a given initial pressure as well be described in full detail hereinafter.

Plates 1, 2 are preferably formed as a pair of circular discs which are coaxial when the instrument is not subjected to external pressures and, as is shown in FIG. 1, in addition to member 3, are connected by a plurality of spaced, flexible, non-resilient coupling elements 4, preferably provided with tensioning or adjusting means shown in FIG. 1 as turnbuckles 4a. Flexible coupling elements 4 may assume the form of chains which are disposed in surrounding relationship externally of the outer surface of resilient member 3 and which have their free ends anchored in plates 1, 2, respectively. The characteristic feature of coupling elements 4 is that they are swingable and bendable in all directions so as to permit movements of plate 2 not only toward but also at any other angle with respect to the bottom plate 1. The anchoring of free ends of chains 4 in plates 1, 2 may be carried out by welding or in any other suitable way. It can be said that the plates 1, 2 are connected with each other by elements 3 and 4 in such manner as to be movable one relative to the other in all directions save in the direction away from each other. Thus, the upper plate 2 may be moved toward, in directions parallel with, or at any other desired angle relative to the bottom plate 1, but is prevented by flexible elements 4 from moving away from member 1 to an extent greater than the maximum length of elements 4.

Resilient member 3 is preferably of considerable length. Thus, the length of member or sleeve 3, which equals the distance between plates 1, 2, may be somewhere between one-third and two-thirds of its maximum outer diameter. Between the plates 1, 2, sleeve 3 is formed with a rather pronounced bulge 3b whose radius may be in the range of between about one-fourth and one-third of the maximum outer diameter of the remaining portion of member 3. It should be understood, however, that the actual dimensions of sleeve 3 may deviate from those given hereinabove.

The bottom plate 1 is formed with a channel or bore 5 which constitutes a means through which the hydraulic pressure medium filling the chamber 3a communicates with the interior of an indicator here shown as a manometer 6 serving as a means for visually representing the pressure of entrapped fluid medium. The manometer 6 is screwed into the outer end of channel or bore 5 in the peripheral zone of bottom plate 1. As an alternative which is not shown in the drawings, the manometer 6 may be connected with bore 5 in plate 1 through a flexible or rigid conduit of any desired length.

The pressure medium may be introduced into chamber 3a either through the channel 5 or through a separate inlet passage which may communicate with channel 5 or directly with the pressure chamber 3a. Such separate inlet passage is preferably controlled by a cock or valve of any suitable design.

The ends of sleeve 3 are connected to plates 1, 2 by means of clamping or retaining rings 8 whose inwardly extending flanges 8a engage with the beads 3c at the respective extremities of member 3 and press the same against the inner sides of plates 1, 2, respectively. The rings 8 form fluid-tight seals between member 3 on the one hand and the plates 1, 2 on the other hand, and are fastened to the latter by preferably uniformly spaced screws 7. It will be noted that, in the embodiment of my invention shown in FIG. 1, the outer diameter of each ring 8 approximates the outer diameter of bulge 3b. Annular surfaces 8b of rings 8 are preferably in contact with and conform with the configuration of the adjacent portions of the outer surface of bulge 3b when the force measuring device is not subjected to external pressures.

Figure 2:
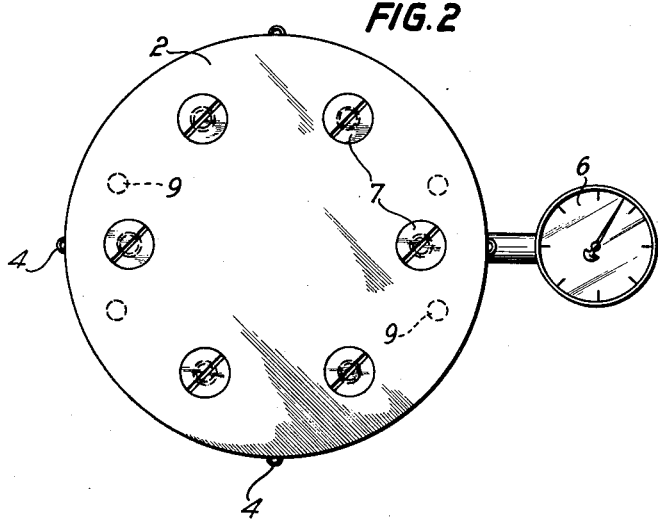
FIG. 2 is a top plan view of the structure shown in FIG. 1.

To put the instrument of FIGS. 1 and 2 into operative condition, the hydraulic fluid may be introduced into and may fill the chamber 3a at a sufficiently high initial pressure. For example, after having reached a pressure of about 3 atmospheres, the fluid is entrapped in chamber 3a by sealing the latter from the surrounding atmosphere. In such instances, the provision of tensioning or adjusting means 4a in flexible elements 4 is not absolutely necessary; however, if provided, such tensioning means may be utilized for fine adjustments in the initial pressure of hydraulic fluid filling the chamber 3a.

As an alternative, and assuming that the flexible elements 4 are provided with tensioning means 4a, as is shown in FIG. 1, the length of flexible coupling elements or chains 4 is so increased by suitable manipulation of adjusting means 4a that the chamber 3a may be filled with a fluid without subjecting the latter to any sort of pressure. When the chamber 3a is completely filled with a liquid pressure medium which, at that time, is subjected to no pressure, the conduit or passage through which the medium was introduced is sealed by a valve, cock, plug or in any other suitable manner. Care should be taken not to permit entry of air into the chamber 3a. By operating the adjusting means 4a in such manner as to shorten the length of flexible elements 4, i.e. by reducing the distance between plates 1, 2 and by simultaneously compressing and deforming the resilient member or sleeve 3, the intial pressure of hydraulic medium entrapped in chamber 3a may be raised to a desired value. The initial pressure may be measured by a special gauge and, after such initial pressure has been brought to a desired value, the finger of manometer 6 is moved into its initial or zero position whereupon the instrument is ready for immediate use in a mine shaft or the like.

As may be observed in FIG. 1, the stresses applied to plate 2 in the direction of arrow X cannot bring about a tangling, locking or any other improper operation of connecting elements 4. The upper plate 2 merely assumes a corresponding position with respect to bottom plate 1, and it is even possible to subject the upper plate to stresses acting in the direction of arrow Y, i.e. in a direction substantially parallel with the plane of bottom plate 1.

To properly position the instrument at the locale of actual use, the underside of lower plate 1 may be formed with say four projections or studs 9 which, when suitably anchored, maintain plate 1 in desired position. When the instrument is to be fastened atop a U-shaped supporting means 12, the studs or lugs 9 may be connected by wire or wires 10 or in any other suitable fashion. As is shown in FIG. 1, the studs 9 abut against the upper outer edges of support 12 and thus prevent movements of plate 1 in lateral directions, while the wire or wires 10 prevent movements of plate 1 upwardly and away from support 12. Studs 9 may be replaced or supplemented by similar projections 9a which latter may extend into the groove or cavity 12a in support 12 and abut against the adjacent surfaces of the latter.

For better guidance and more secure connection of the ends of member 3 to plate 1 and/or 2, an internal annulus 11 may be connected to the inner side of one or both members 1, 2. One such annulus 11 is shown in FIG. 1 connected to the underside of upper pressure plate 2 and extending into the upper end of chamber 3a.

The initial pressures prevailing in chamber 3a when the instrument is ready for use are preferably in the range of between about 2.5 and 4 atmospheres. The material and dimensions of resilient member 3 should be so selected that the latter can withstand pressures in the range of between 100 and 150 atmospheres, or even higher pressures. Member 3 may consist of rubber or any suitable synthetic plastic material with resilient characteristics, and should be capable of yielding to pressures acting upon plate 2 in perpendicular or any other direction.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A force measuring device, particularly for determining the stresses upon the frameworks in underground excavations, said device comprising, in combination: a pair of spaced plates; a resiliently deformable tubular member disposed between and having a pair of ends each sealingly connected to one of said plates, said member defining with said plates a pressure chamber; a supply of compressed hydraulic pressure medium filling said chamber for permanently urging said plates in a direction away from each other; pressure indicating means; means defining a passage for communication of said medium between said indicating means and said chamber; a plurality of flexible chains of fixed length, each chain extending between said plates externally of said resilient member for restricting in all directions the movements of said plates with respect to each other to a maximum distance equal to the fixed length of said chains, each chain having two ends each of which is connected to one of said plates and each chain extending in a direction substantially perpendicular to the planes of said plates when the plates are not subjected to external pressures; and a turnbuckle in each chain for varying the length thereof, the device operating in such manner that, when at least one of said plates is subjected to external forces to further compress said pressure medium, said resilient member is deformed and the magnitude of pressures thereby transmitted to said medium is visually represented by said indicating means.

2. A force measuring device, particularly for determining the stresses upon the frameworks in underground excavations, said device comprising, in combination: a pair of spaced pressure plates, each plate having an inner side; a resilient tubular member disposed between and having a pair of ends each comprising an outwardly extending circular bead, said member defining with said plates a presssure chamber; a clamping ring disposed about each of said beads for sealingly connecting the same to the inner side of the respective plate; a guide annulus connected to the inner side of at least one of said plates and extending into the respective end of said resilient member whereby at least one of said beads is received between one of said clamping rings and said annulus; a supply of compressed hydraulic pressure medium filling said chamber for permanently urging said plates in a direction away from each other; pressure indicating means; means defining a passage for communication of said medium between said indicating means and said chamber; and a plurality of flexible coupling elements of fixed length, each coupling element connected to and extending between said plates externally of said member for restricting in all directions the movements of said plates with respect to each other to a maximum distance equal to the fixed length of said coupling elements, the device operating in such manner that, when at least one of said plates is sbujected to external forces to further compress said pressure medium, said resilient member is deformed and the magnitude of pressures thereby transmitted to said medium is represented by said indicating means.

3. A force measuring device, particularly for determining the stresses upon the frameworks in underground excavations, said device comprising, in combination: a pair of spaced pressure plates, each plate having an inner side; a resilient tubular member disposed between and having a pair of ends each adjacent to the inner side of one of said plates and a circular bulge intermediate said plates, said bulge having an outer diameter, and said member defining with said plates a pressure chamber; a clamping ring engaging each end of said member for sealingly connecting the same to the inner side of the respective pressure plate, each clamping ring having an outer diameter approximating the outer diameter of said bulge; a supply of compressed hydraulic pressure medium filling said chamber for permanently urging said pressure plates in a direction away from each other; pressure indicating means; means defining a passage for communication of said medium between said indicating means and said chamber; and a plurality of flexible coupling elements of fixed length, each coupling element connected to and extending between said plates externally of said member for restricting in all directions the movements of said plates with respect to each other to a maximum distance equal to the fixed length of said coupling elements, the device operating in such manner that, when one of said plates is subjected to external forces to further compress said pressure medium, said resilient member is deformed and the magnitude of pressures thereby transmitted to said medium is represented by said indicating means.

4. A force measuring device, particularly for determining the stresses upon the frameworks in underground excavations, said device comprising, in combination: a pair of spaced pressure plates each having an inner side; a resilient tubular member disposed between and having a pair of ends each adjacent to the inner side of one of said plates, said member defining with said plates a pressure chamber and further comprising a median circular bulge having an outer diameter and an outer surface; a clamping ring for connecting each end of said member to the inner side of the respective plate, each clamping ring having an outer diameter approximating the outer diameter of said bulge and each having an annular surface adjacent to a portion of the outer surface of said bulge; a supply of compressed hydraulic pressure medium filling said chamber for permanently urging said pressure plates in a direction away from each other; pressure indicating means; means defining a passage for communication of said medium between said indicating means and said chamber; and a plurality of flexible coupling elements of fixed length, each coupling element connected to and extending between said plates externally of said resilient member for restricting in all directions the movements of said plates with respect to each other to a maximum distance equal to the fixed length of said coupling elements, the device operating in such manner that, when one of said plates is subjected to external forces to further compress said pressure medium, said resilient member is deformed and the magnitude of pressures thereby transmitted to said medium is represented by said indicating means.

References Cited in the file of this patent

UNITED STATES PATENTS

| | | |
|---|---|---|
| 822,244 | Bristol | June 5, 1906 |
| 2,577,100 | Alvarez | Dec. 4, 1951 |
| 2,639,613 | Richmond | May 26, 1953 |
| 2,642,091 | Morin | June 16, 1953 |
| 2,898,761 | Hast | Aug. 11, 1959 |
| 2,973,641 | Webster | Mar. 7, 1961 |

FOREIGN PATENTS

| | | |
|---|---|---|
| 26,809 | Great Britain | Nov. 16, 1897 |
| 161,086 | Switzerland | June 16, 1933 |